United States Patent
Cho et al.

(10) Patent No.: US 7,693,924 B2
(45) Date of Patent: Apr. 6, 2010

(54) 2N-POINT AND N-POINT FFT/IFFT DUAL MODE PROCESSOR

(75) Inventors: Sang In Cho, Daejeon (KR); Sangsung Choi, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1190 days.

(21) Appl. No.: 11/264,886

(22) Filed: Nov. 2, 2005

(65) Prior Publication Data

US 2006/0093052 A1　　May 4, 2006

(30) Foreign Application Priority Data

Nov. 3, 2004　　(KR) ...................... 10-2004-0088768

(51) Int. Cl.
*G06F 17/14*　　(2006.01)
(52) U.S. Cl. ...................................................... 708/404
(58) Field of Classification Search ........................ None
See application file for complete search history.

(56) References Cited

U.S. PATENT DOCUMENTS

| | | | |
|---|---|---|---|
| 5,293,330 | A | 3/1994 | Sayegh |
| 6,990,062 | B2 * | 1/2006 | Greaves et al. ............... 370/210 |
| 7,461,114 | B2 * | 12/2008 | Nakazuru et al. ............ 708/404 |
| 7,543,009 | B2 * | 6/2009 | Pisoni ......................... 708/403 |
| 2006/0271613 | A1 * | 11/2006 | Mitsuishi et al. ............ 708/404 |
| 2007/0073796 | A1 * | 3/2007 | Meilhac et al. .............. 708/404 |

FOREIGN PATENT DOCUMENTS

KR　　10-20040026910　　4/2004

OTHER PUBLICATIONS

"Computationally Efficient Fast Algorithm and Architecture for the IFFT/FFT in DMT/OFDM Systems," An-Yeu Wu et al, 1998 IEEE Workshop on Signal Processing Systems, pp. 356-365.

* cited by examiner

*Primary Examiner*—David H Malzahn
(74) *Attorney, Agent, or Firm*—Ladas & Parry LLP (57) ABSTRACT

A 2N-point and N-point FFT/IFFT dual mode processor is provided. The processor includes a butterfly operator, the first and second MUXs, and the first and second N-point FFT processors. The butterfly operator receives 2N data and butterfly-operates on the received 2N data when receiving a control signal '0' from the controller. The first and second MUXs respectively receive results from the butterfly operator to output the results in an increment of N when receiving a control signal '0' from the controller, and respectively outputs different N data when receiving a control signal '1' from the controller. The first and second N-point FFT processors N-point FFT operate on the results from the first and second MUXs and respectively output the same under control of the controller. Since the N-point FFT operation can be simultaneously performed two times at a receiver, the performance of the receiver can be enhanced.

2 Claims, 6 Drawing Sheets

2N-POINT AND N-POINT FFT/IFFT DUAL MODE PROCESSOR

BACKGROUND OF THE INVENTION

1. Field of the Invention

The present invention relates to a 2N-point and N-point fast Fourier transform (FFT)/inverse fast Fourier transform (IFFT) dual mode processor, and more particularly, to a 2N-point and N-point FFT/IFFT dual mode processor for allowing a 2N-point FFT processor and a N-point FFT processor to operate in a dual mode in achieving an IFFT/FFT processor used in a orthogonal frequency division multiplexing (OFDM) system.

2. Description of the Related Art

As known in the art, OFDM means a method for dividing data having a high-speed transmission rate into a plurality of data lines having a low-speed transmission rate and simultaneously transmitting the plurality of data lines using a plurality of sub-carrier waves. A process for making such sub-carrier waves and conveying the data on the sub-carrier waves is an IFFT/FFT operation. The transmission terminal of OFDM requires an IFET operation so as to convey data on a plurality of sub-carrier waves, and the reception terminal of OFDM requires an FET operation so as to obtain data from a plurality of sub-carrier waves.

Figure 1:
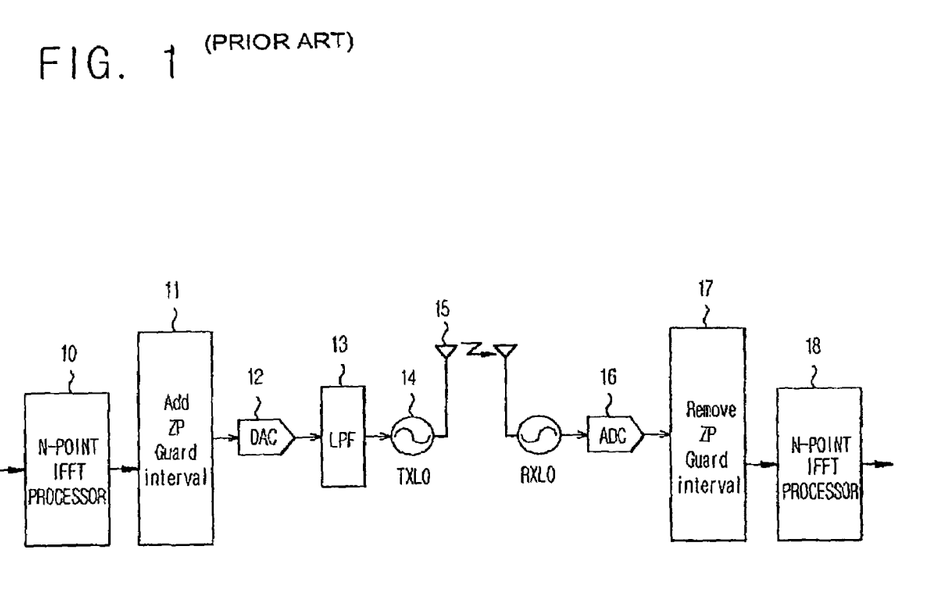
FIG. 1 is a functional block diagram of a conventional OFDM system having N sub-carrier waves.
Figure 2A:
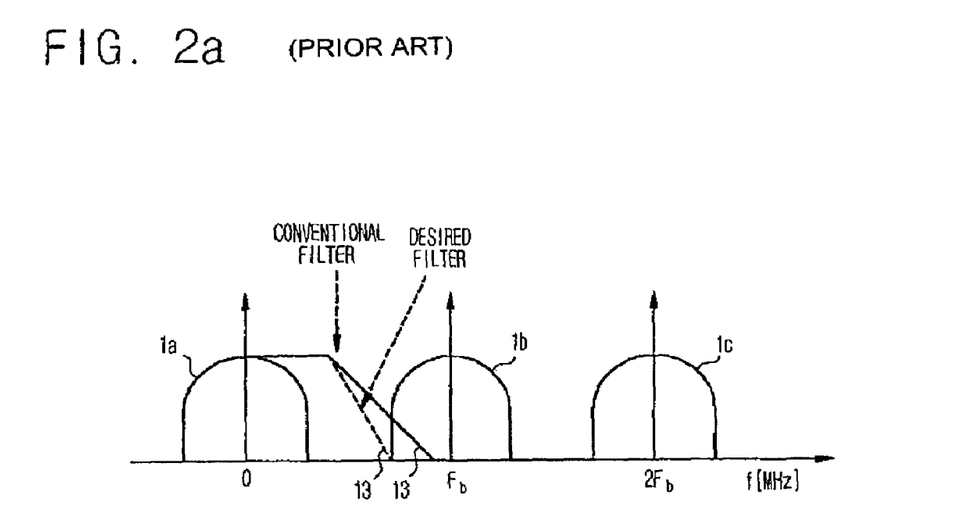
FIG. 2A is a view illustrating the frequency spectrum of an N-point IFFT signal after a DAC in the OFDM system illustrated in FIG. 1.
Figure 2B:
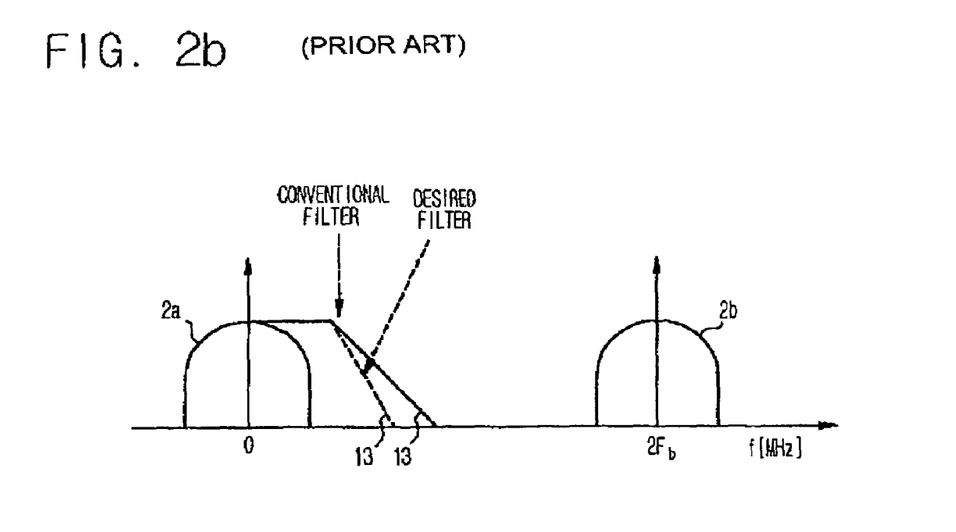
FIG. 2B is a view illustrating the frequency spectrum of a 2N-point IFFT signal after a DAC in the OFDM system illustrated in FIG. 1.

FIG. 1 is a block diagram illustrating processes performed by an IFFT processor of the transmission terminal and by an FFT processor of the reception terminal. Referring to FIG. 1, an N-point IFFT processor 10 of an OFDM system conveys data on n sub-carrier waves. At this point, after a guard interval (GI) is added to an N-point IFFT-processed signal at a next block 11, an N-point IFFT-processed signal is delivered to a digital-to-analog converter (DAC) 12. After that, the spectrum of a signal from the DAC 12 has frequency spectrum waveforms 1a, 1b, and 1c as illustrated in FIG. 2A. A low pass filter (LPF) 13 is used to pass only a baseband signal component 1a from the repeated frequency components.

FIG. 2 is a view illustrating the spectrum of an N-point IFFT signal after the DAC 12 of the transmission terminal illustrated in FIG. 1. At this point, the frequency spectrums 1a, 1b, and 1c of a signal are repeated by a period F(b). To convey a signal on a carrier wave frequency, only a baseband signal component 1a should be obtained and the other signal components 1b and 1c should be removed. For that purpose, the LPF 13 is required as described above.

The above obtained baseband signal 1a is wirelessly transmitted through a local oscillator 14 and an antenna 15. The reception terminals 16, 17, and 18 recover data using reverse processes with respect to the processes performed at the transmission terminals 11 to 15. Referring to FIG. 1, the OFDM system requires the N-point IFFT processor 10 of the transmission terminal and the N-point FFT processor 18 of the reception terminal. At this point, the IFFT processor can be replaced by the FFT processor. That is, when inputs of the real part and the imaginary part in the FFT processor are exchanged and the real part and the imaginary part of an output are exchanged, the IFFT operation can be possible. The proof thereof can be provided when A(k) and B(k) of Equation 1 is compared with a(n) and b(n) of Equation 2 in the following Equations 1 and 2.

Equation 1

$$FFT: X(k) = \sum_{n=0}^{N-1} x(n)e^{-j\frac{2\pi}{N}kn}$$

$$X(k) = A(k) + jB(k),$$

$$x(n) = a(n) + jb(n)$$

so that $$A(k) + jB(k) = \sum_{n=0}^{N-1} \{a(n) + jb(n)\}\left\{\cos\left(j\frac{2\pi}{N}kn\right) - j\sin\left(j\frac{2\pi}{N}kn\right)\right\}$$

$$= \sum_{n=0}^{N-1} [\{a(n)\cos\theta_{kn} + b(n)\sin\theta_{kn}\} + j\{-a(n)\sin\theta_{kn} + b(n)\cos\theta_{kn}\}]$$

$$A(k) = \sum_{n=0}^{N-1} \{a(n)\cos\theta_{kn} + b(n)\sin\theta_{kn}\}$$

$$B(k) = \sum_{n=0}^{N-1} \{-a(n)\sin\theta_{kn} + b(n)\cos\theta_{kn}\}$$

$$\text{IFFT: } X(n) = \sum_{k=0}^{N-1} X(k)e^{j\frac{2\pi}{N}kn}$$

Equation 2

$$a(n) + jb(n) = \frac{1}{N}\sum_{k=0}^{N-1}\{A(k) + jB(k)\}\left\{\cos\left(j\frac{2\pi}{N}kn\right) + j\sin\left(j\frac{2\pi}{N}kn\right)\right\}$$

$$= \frac{1}{N}\sum_{k=0}^{N-1}[\{A(k)\cos\theta_{kn} - B(k)\sin\theta_{kn}\} + j\{A(k)\sin\theta_{kn} + B(k)\cos\theta_{kn}\}]$$

$$a(n) = \sum_{k=0}^{N-1}\{A(k)\sin\theta_{kn} + A(k)\cos\theta_{kn}\}$$

$$b(n) = \sum_{k=0}^{N-1}\{B(k)\cos\theta_{kn} + A(k)\sin\theta_{kn}\}$$

As described above, the N-point FFT processor is replaced by the N-point IFFT processor in the OFDM system of FIG. 1.

Referring to FIG. 2, to convey a signal on a desired carrier wave frequency, only a baseband signal component 1a should be obtained and the other signal components 1b and 1c should be removed. For that purpose, the LPF 13 is required as described above. To pass only the baseband signal component 1a and remove the signal 1b having a main frequency F(b) in its frequency components, the LPF 13 having a very narrow transition band is required. However, when the transition band of the LPF 13 is larger than the interval of the repeated OFDM signal spectrum, noises are generated.

To solve such a problem, the transition band of the LPF 13 is made very narrow or the interval of the repeated OFDM signal spectrum is widened so that noises may not be generated.

At this point, when the interval between the intervals of the repeated frequency spectrums is too narrow, the LPF 13 is difficult to realize and filtering cannot be performed properly. To solve this problem, it is possible to widen the interval between the repeated frequency spectrums by inserting, at the IFFT processor, N-point '0' into N-point data. In that case, the IFFT processor performs an operation using 2N-point and the FFT processor performs an operation using N-point. As described above, the N-point FFT processor and the 2N-point IFFT processor can be simultaneously required in one system.

However, in the case where the N-point FFT processor and the 2N-point IFFT processor can be simultaneously required in one system in the conventional art, the N-point FFT processor and the 2N-point FFT processor are separately and respectively designed to realize a system, so that a system design is difficult and the manufacturing costs increase.

SUMMARY OF THE INVENTION

Accordingly, the present invention is directed to a 2N-point and N-point FFT/IFFT dual mode processor, which substantially obviates one or more problems due to limitations and disadvantages of the related art.

It is an object of the present invention to provide a 2N-point and N-point FFT/IFFT dual mode processor capable of efficiently using a hardware by allowing one processor to perform a 2N-point FFT processor operation and an N-point FFT processor operation in realizing a FFT/IFFT processor, or capable of enhancing the performance of a receiver by allowing an N-point operation to be performed two times simultaneously.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a 2N-point and N-point FFT/IFFT dual mode processor including: a controller for outputting a corresponding control signal when an operation is a 2N-point FFT operation and outputting a corresponding control signal when an operation is a N-point FFT operation; a butterfly operator for receiving 2N data (x[N−1] . . . x[0], x[2N−1] . . . x[N]) to perform a butterfly operation when a 2N-point FFT operation control signal is received from the controller; first and second MUXs for receiving results of the butterfly operator to output the received results in an increment of N when a 2N-point FFT operation control signal is received from the controller, and receiving different N data (x[N−1] . . . x[0], x[N−1]' . . . x[0]') to output the same when a N-point FFT operation control signal is received from the controller; a first N-point FFT processor for N-point FFT-operating on outputs from the first MUX to output even-numbered results of the 2N-point FFT when a 2N-point FFT operation control signal is received from the controller, and N-point FFT-operating on outputs from the first MUX to output the same when a N-point FFT operation control signal is received from the controller; and a second N-point FFT processor for N-point FET-operating on outputs from the second MUX to output odd-numbered results of the 2N-point FFT when a 2N-point FFT operation control signal is received from the controller, and N-point FFT-operating on outputs from the second MUX to output the same when a N-point FFT operation control signal is received from the controller.

In another aspect of the present invention, there is provided a 2N-point and N-point FFT/IFFT dual mode processor including: a first N-point FFT processor for receiving and N-point FFT operating on N data (x[N−1] . . . x[0]) to output the processed data; a controller for outputting a corresponding control signal when an operation is a 2N-point FFT operation and outputting a corresponding control signal when an operation is a N-point FFT operation; a twiddle factor multiplier for receiving N data (x[N−1] . . . x[0]) to perform a twiddle multiplication operation when a 2N-point FFT operation control signal is received from the controller; a MUX for passing results from the twiddle factor multiplier when a 2N-point FFT operation control signal is received from the controller and passing other N data (x[N−1]' . . . x[0]') when an N-point FFT operation control signal is received from the controller; and a second N-point FFT processor for N-point FFT-operating on outputs from the MUX to output odd-numbered results of the 2N-point FFT when a 2N-point FFT operation control signal is received from the controller, and N-point FFT-operating on outputs (x[N−1]' . . . x[0]') from the MUX to output the same when a N-point FFT operation control signal is received from the controller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 3:
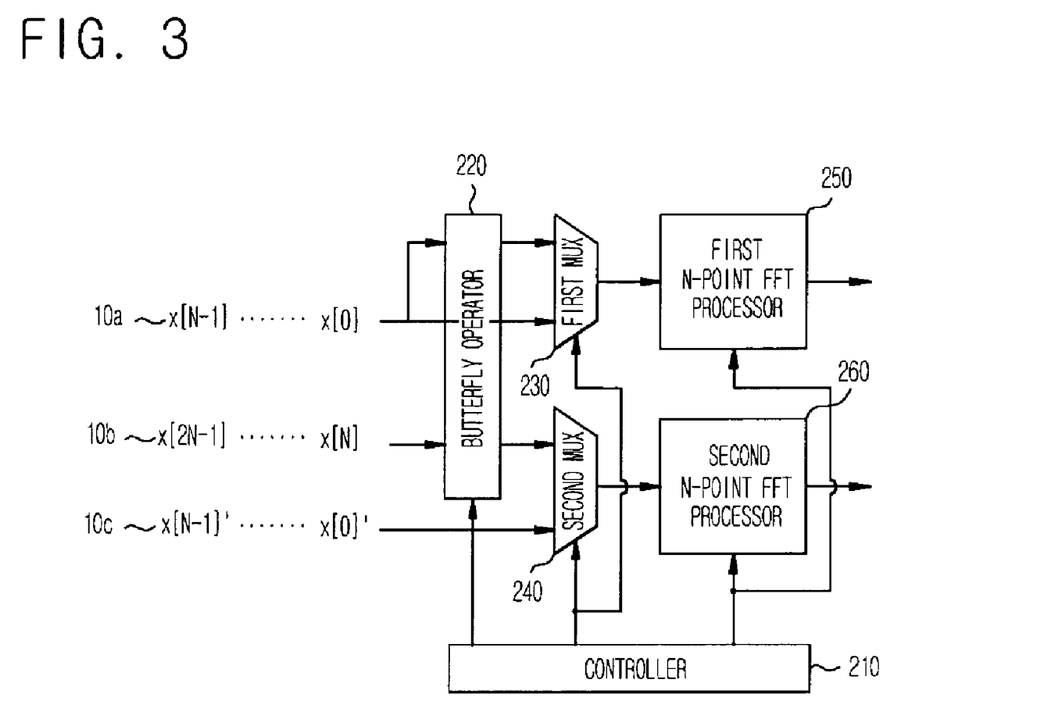
FIG. 3 is a function block diagram of a 2N-point and N-point FFT/IFFT dual mode processor according to one embodiment of the present invention.

FIG. 3 is a functional block diagram of a 2N-point and N-point FFT/IFFT dual mode processor according to one embodiment of the present invention. Referring to FIG. 3, the 2N-point and N-point FFT/IFFT dual mode processor includes a controller 210, a butterfly operator 220, first and second MUXs 230 and 240, a first N-point FFT processor 250, and a second N-point FFT processor 260.

At this point, the controller 210 outputs a control signal '0' for a 2N-point FFT operation, and a control signal '1' for an N-point FFT operation to the butterfly operator 220, the first and second MUXs 230 and 240, and the first and second N-point FFT processors 250 and 260.

When a control signal '0' is received from the controller 210, the butterfly operator 220 receives 2N data (x[N−1] . . . x[0], x[2N−1] . . . x[N]) 10a and 10b, butterfly-operates on the 2N data, and outputs the operated data to the first and second MUXs 230 and 240, respectively.

Also, the first MUX 230 is connected to the first N-point FFT processor 250 to output results from the butterfly operator 220 to the first N-point FFT processor 250 when a control signal '0' is received from the controller 210. On the contrary, the first MUX 230 passes N data (x[N−1] . . . x[0]) 10a to the first N-point FFT processor 250 when a control signal '1' is received from the controller 210.

The second MUX 240 is connected to the second N-point FFT processor 260 to pass results from the butterfly operator 220 to the second N-point FFT processor 260 when a control signal '0' is received from the controller 210. On the contrary, the second MUX 240 passes N data (x[N−1]' . . . x[0]') 10c to the first N-point FFT processor 250 when a control signal '1' is received from the controller 210.

When a control signal '0' is received from the controller 210, the first N-point FFT processor 250 N-point FFT-operates on outputs from the first MUX to output even-numbered results of a 2N-point FFT. On the contrary, when a control signal '1' is received from the controller 210, the first N-point FFT processor 250 N-point FFT-operates on outputs from the first MUX and outputs the same.

When a control signal '0' is received from the controller 210, the second N-point FFT processor 260 N-point FFT-operates on outputs from the second MUX to output odd-numbered results of a 2N-point FFT. On the contrary, when a control signal '1' is received from the controller 210, the second N-point FFT processor 260 N-point FFT-operates on outputs from the second MUX to output the same.

Figure 4:
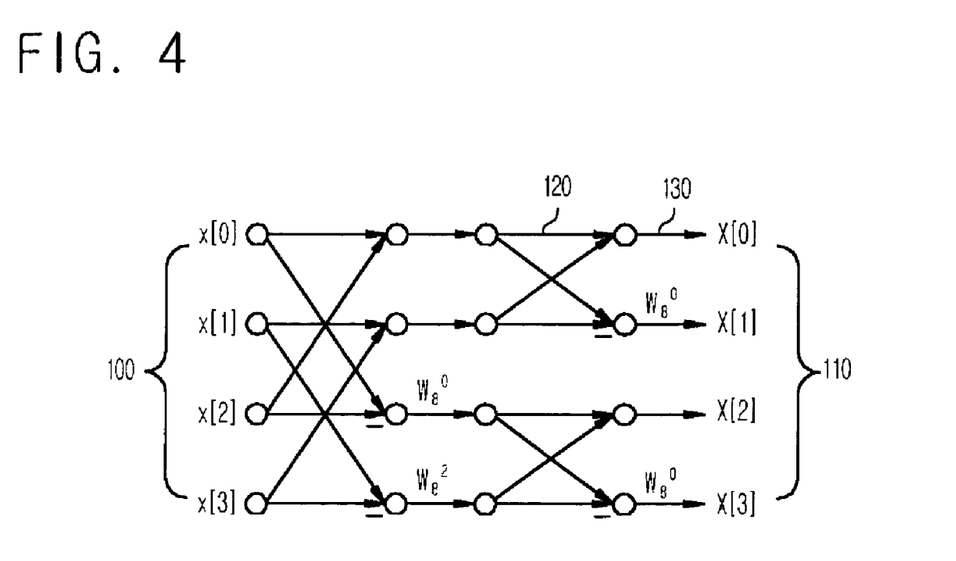
FIG. 4 is a view illustrating a 4-point FFT operation explaining an operation of 2N-point and N-point FFT/IFFT dual mode processor illustrated in FIG. 3.

FIG. 4 is a view illustrating an operation procedure of a 4-point FFT processor. In operation, after an addition of a butterfly structure 120 is performed using two data for its input, the addition result is repeatedly multiplied by a twiddle factor 130. When the above operation is changed by a decimation in frequency (DIF) FFT operation to rapidly operate on a discrete Fourier transform (DFT) equation, the following Equation 3 is given.

$$X(k) = \sum_{n=0}^{N-1} x(n) W_N^{kn} \qquad \text{Equation 3}$$

$$= \sum_{n=0}^{\frac{N}{2}-1} x(n) W_N^{kn} + W_N^{\frac{kN}{2}-1} x\left(\frac{N}{2}+n\right) W_N^{kn}$$

$$= \sum_{n=0}^{\frac{N}{2}-1} x(n) W_N^{kn} + (-1)^k x\left(\frac{N}{2}+n\right) W_N^{kn}$$

$$X(2r) = \sum_{n=0}^{\frac{N}{2}-1} \left[x(n) + x\left(\frac{N}{2}+n\right)\right] W_{\frac{N}{2}}^{rn}$$

-continued $$X(2r+1) = \sum_{n=0}^{\frac{N}{2}-1} \left[x(n) - x\left(\frac{N}{2}+n\right)\right] W_N^n W_{\frac{N}{2}}^m$$

Figure 5:
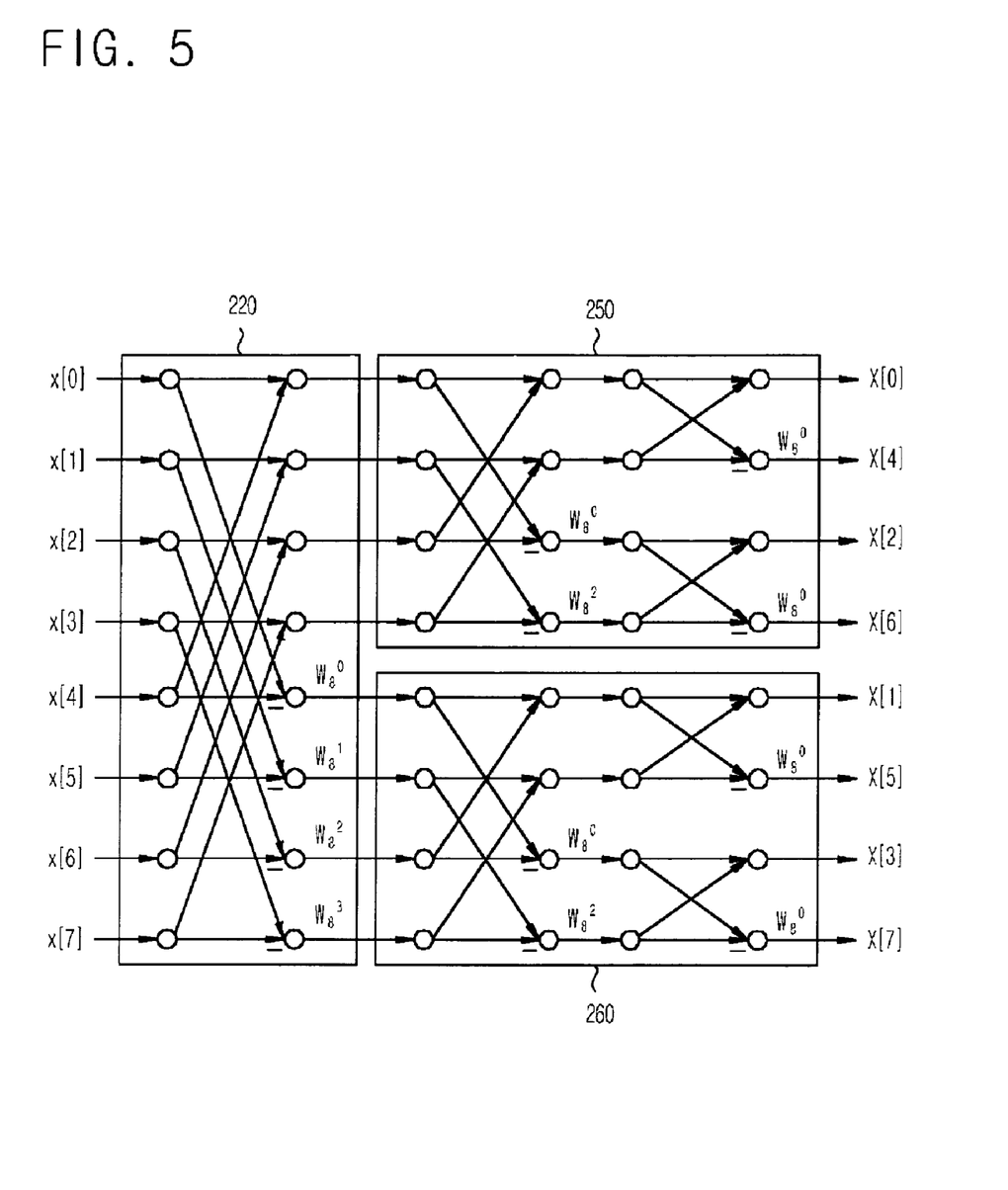
FIG. 5 is a view illustrating a 8-point FFT operation explaining an operation of a 2N-point and N-point FFT/IFFT dual mode processor illustrated in FIG. 3.

FIG. 5 is a view illustrating an operation procedure of an 8-point FFT processor. At this point, it is reveal that the operation procedure of the 8-point FFT processor is substantially the same as that of the 4-point FFT processor illustrated in FIG. 4, and the procedure has a structure in which there are two 4-point FFT processors 250 and 260 when the butterfly operator 220 and the twiddle factor multiplication are excluded. As revealed from FIG. 5, the 2N-point FFT processor can perform an N-point FFT operation and can also perform two N-point FFT operations simultaneously.

First, the 2N-point FFT operation will be described. The controller 210 outputs a control signal '0' to the butterfly operator 220, the first and second MUXs 230 and 240, and the first and second N-point processors 250 and 260. Then, the butterfly operator 220 receives a control signal '0' from the controller 210, butterfly-operates on 2N data (x[N−1] ... x[0], x[2N−1] ... x[N]) 10a and 10b, and outputs the operated data to the first and second MUXs 230 and 240, respectively.

At this point, when a control signal '0' is received from the controller 210, the first and second MUXs 230 and 240 receive results from the butterfly operator 220, respectively, and output the received results in an increment of N to the first and second N-point FFT processors, respectively.

After receiving a control signal '0' from the controller 210, the first N-point FFT processor 250 N-point FFT-operates on outputs from the first MUX 230 to output even-numbered results from the 2N-point FFT processor.

After receiving a control signal '0' from the controller 210, the second N-point FFT processor 260 N-point FFT-operates on outputs from the second MUX 240 to output odd-numbered results from the 2N-point FFT processor.

Now, the N-point FFT operation will be described.

The controller 210 outputs a control signal '1' to the butterfly operator 220, the first and second MUXs 230 and 240, and the first and second N-point processors 250 and 260.

Next, the first and second MUXs 230 and 240 pass different N data (x[N−1] ... x[0], x[N−1]', ... x[0]') 10a and 10c to the first and second N-point FFT processors 250 and 260, respectively, under control of the controller 210. The first N-point FFT processor 250 N-point FFT-operates on outputs form the first MUX 230 to output the same, and the second N-point FFT processor 260 N-point FFT-operates on outputs form the second MUX 240 to output the same.

Now, description will be made in detail for a 2N-point and N-point FFT/IFFT dual mode processor where an N-point '0' is inserted with reference to the accompanying drawings.

Figure 6:
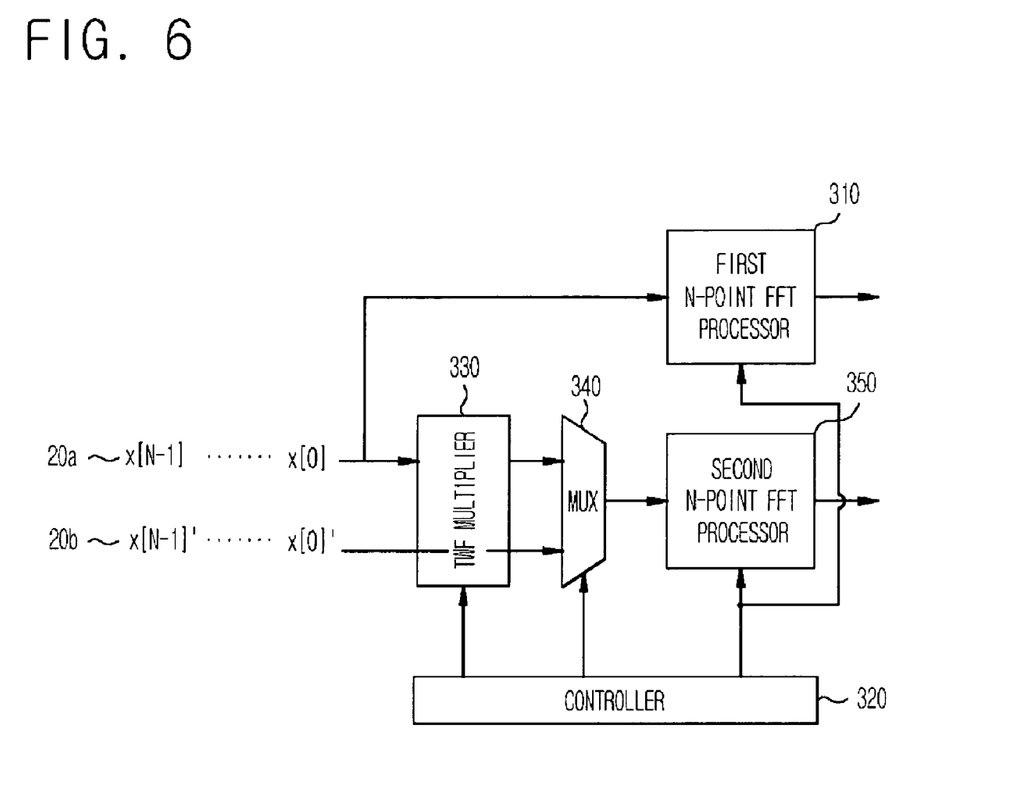
FIG. 6 is a function block diagram of a 2N-point and N-point FFT/IFFT dual mode processor according to another embodiment of the present invention.

FIG. 6 is a functional block diagram of a 2N-point and N-point FFT/IFFT dual mode processor according to another embodiment of the present invention. The 2N-point and N-point FFT/IFFT dual mode processor includes the first N-point FFT processor 310, a controller 320, a twiddle factor (TWF) multiplier 330, a MUX 340, and the second N-point FFT processor 350.

After receiving N data (x[N−1] ... x[0]) 20a, the first N-point processor 310 N-point FFT-operates on the N data and outputs the same.

The controller 320 outputs a control signal '0' in case of a 2N-point FFT operation and outputs a control signal '1' in case of an N-point FFT operation to the TWF 330, the MUX 340, and the second N-point FFT processor 350.

Also, when receiving a control signal '0' from the controller 320, the TWF 330 performs a twiddle multiplication operation on the N data (x[N−1] ... x[0]) 20a.

The MUX 340 passes results from the TWF 330 to the second N-point FFT processor 350 when receiving a control signal '0' form the controller 320, and passes other N data (x[N−1]' ... x[0]') 20b when receiving a control signal '1' from the controller 320.

The second N-point FFT processor 350 N-point FFT-operates on outputs from the MUX 340 to output odd-numbered results from the second N-point FFT processor 350 when receiving a control signal '0' from the controller 320, and N-point FFT-operates on outputs (x[N−1]' ... x[0]') from the MUX 340 to output the same when receiving a control signal '1' from the controller 320.

The operation of the 2N-point and N-point FFT/IFFT dual mode processor according to another embodiment of the present invention will be described below.

Figure 7:
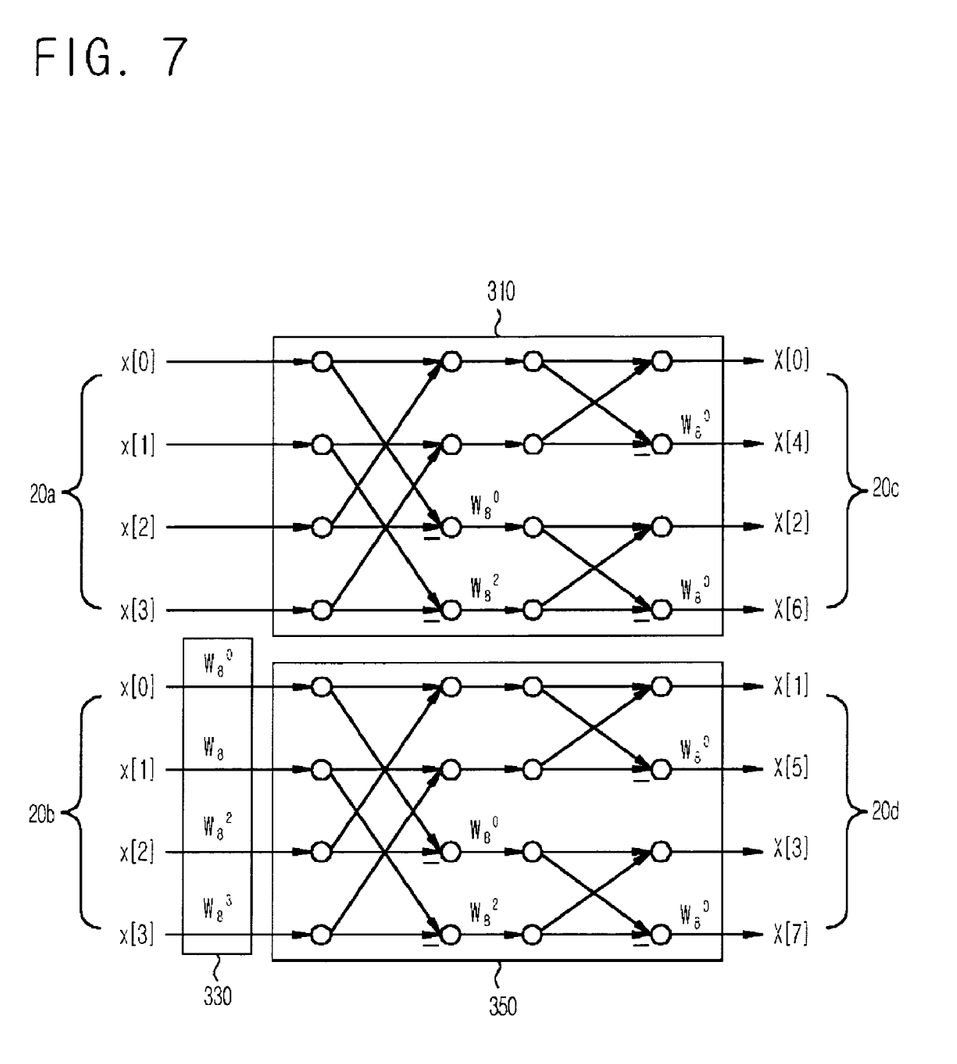
FIG. 7 is a view illustrating a 8-point FFT operation where N-point '0' is inserted, to explain an operation of a 2N-point and N-point FFT/IFFT dual mode processor illustrated in FIG. 6.

FIG. 7 is a view illustrating an 8-point FFT operation where 4-point '0' is inserted into 4-point data. Compared with FIG. 5, FIG. 7 illustrates the butterfly operation is omitted, which can be proved by the following Equation 4. Since x[4], x[5], x[6], and x[7] are all '0', the second term $$W_N^{\frac{kn}{2}} \sum_{n=0}^{\frac{N}{2}-1} x\left(n+\frac{N}{2}\right) W_N^{kn}$$

is cancelled and only the first term $$\sum_{n=0}^{\frac{N}{2}-1} x(n) W_N^{kn}$$

remains in Equation 4. When X(k) is divided into X(2k) and X(2k+1), two Equations become the same with coefficients in X(2k+1) excluded. Such a part is the same as that of the 4-point FFT processor's operation.

$$X(k) = \sum_{n=0}^{N-1} x(n) e^{-j\frac{2\pi}{N}kn} \qquad \text{Equation 4}$$

$$= \sum_{n=0}^{N-1} x(n) W_N^{kn}$$

$$= \sum_{n=0}^{\frac{N}{2}-1} x(n) W_N^{kn} + W_N^{\frac{kn}{2}} \sum_{n=0}^{\frac{N}{2}-1} x\left(n+\frac{N}{2}\right) W_N^{kn}$$

$$= \sum_{n=0}^{\frac{N}{2}-1} x(n) W_N^{kn}$$

$$X(2k) = \sum_{n=0}^{\frac{N}{2}-1} x(n) W_{\frac{N}{2}}^{kn}$$

$$X(2k+1) = \sum_{n=0}^{\frac{N}{2}-1} x(n) W_N^n W_{\frac{N}{2}}^{kn}$$

At this point, referring to FIG. 7, the processor for performing an 8-point FFT operation where 4-point '0' is inserted into the 4-point data can be achieved through an operation 330 of multiplying two 4-point FFT processors 310 and 350 by the TWF. Inputs for the 4-point FFT processors 310 and 350 share the same 4-point data 20a and 20b, and the results from the FFT processors 310 and 350 are divided into even-numbered terms 20c and odd-numbered terms 20d.

FIG. 6 is a block diagram of a 2N-point and N-point FFT/IFFT dual mode processor where N-point '0' is inserted. The 2N-point and N-point FFT/IFFT dual mode processor of FIG. 6 allows the 2N-point FFT operation and the N-point FFT operation to be performed using the MUX 340.

At this point, when a control signal from the controller 320 is '0', N data 20a is inputted to the TWF multiplier 330, where the first multiplication operation is performed and results thereof are inputted to the second N-point FFT processor 350, which outputs odd-numbered results thereof.

On the contrary, when a control signal from the controller 320 is '1', other N data 20b is inputted to the second N-point FFT processor 350, which performs an N-point FFT operation.

The inventive 2N-point and N-point FFT/IFFT dual mode processor allows the 2N-point FFT processor and the N-point FFT processor to operate in the dual mode in achieving the FFT/IFFT processor. Therefore, a system requiring operations in two modes (i.e., a 2N-point FFT processor mode and an N-point FFT processor mode) can share a hardware in achieving the FFT processor, so that small sizing and low power consumption can be achieved. Also, the present invention allows the N-point FFT operation to be performed two times simultaneously, thereby making system design easy as well as enhancing the performance of a receiver.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A 2N-point and N-point FFT (fast Fourier transform)/IFFT (inverse fast Fourier transform) dual mode processor comprising:
   a controller for outputting a corresponding control signal when an operation is a 2N-point FFT operation and outputting a corresponding control signal when an operation is an N-point FFT operation;
   a butterfly operator for receiving 2N data (x[N−1] ... x[0], x[2N−1] ... x[N]) to perform a butterfly operation when receiving a 2N-point FFT operation control signal from the controller;
   first and second MUXs for receiving results from the butterfly operator to output the received results in an increment of N when receiving a 2N-point FFT operation control signal from the controller, and respectively receiving different N data (x[N−1] ... x[0] and x[N−1]' ... x[0]') to output the same when receiving an N-point FFT operation control signal from the controller;
   a first N-point FFT processor for N-point FFT-operating on outputs from the first MUX to output even-numbered results of the 2N-point FFT when receiving a 2N-point FFT operation control signal from the controller, and N-point FFT-operating on outputs from the first MUX to output the same when receiving a N-point FFT operation control signal from the controller; and
   a second N-point FFT processor for N-point FFT-operating on outputs from the second MUX to output odd-numbered results of the 2N-point FFT when receiving a 2N-point FFT operation control signal from the controller, and N-point FET-operating on outputs from the second MUX to output the same when receiving a N-point FFT operation control signal from the controller.

2. A 2N-point and N-point FFT (fast Fourier transform)/IFFT (inverse fast Fourier transform) dual mode processor comprising:
   a first N-point FFT processor for receiving and N-point FFT-operating on N data (x[N−1] ... x[0]) to output the operated data;
   a controller for outputting a corresponding control signal when an operation is a 2N-point FFT operation and outputting a corresponding control signal when an operation is a N-point FFT operation;
   a TWF (twiddle factor) multiplier for receiving N data (x[N−1] ... x[0]) to perform a twiddle multiplication operation when receiving a 2N-point FET operation control signal from the controller;
   a MUX for passing results from the TWF multiplier when receiving a 2N-point FFT operation control signal from the controller and passing other N data (x[N−1]' ... x[0]') when receiving an N-point FFT operation control signal from the controller; and
   a second N-point FFT processor for N-point FFT-operating on outputs from the MUX to output odd-numbered results of the 2N-point FFT processor when receiving a 2N-point FFT operation control signal from the controller, and N-point FFT-operating on outputs (x[N−1]' ... x[0]') from the MUX to output the same when receiving a N-point FFT operation control signal from the controller.

* * * * *